United States Patent Office 3,642,766
Patented Feb. 15, 1972

3,642,766
FIBER-REACTIVE DISAZODYESTUFFS CONTAINING A PYRIMIDINE RADICAL
Werner Bossard, Riehen, near Basel, Switzerland, assignor to J. R. Geigy AG, Basel, Switzerland
No Drawing. Filed Apr. 3, 1968, Ser. No. 718,383
Claims priority, application Switzerland, Apr. 20, 1967, 5,664/67
Int. Cl. C07c 107/00; C09b 35/20, 43/12
U.S. Cl. 260—154        7 Claims

ABSTRACT OF THE DISCLOSURE

Disazo dyestuffs of the formula

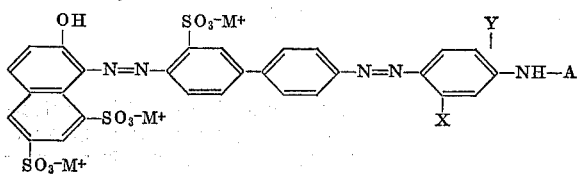

wherein A represents a fiber-reactive acyl radical capable of forming at least one covalent bond with a cellulosic or polyamide substrate, and wherein X represents hydrogen or lower alkyl and Y represents hydrogen, lower alkyl or lower alkoxy, are disclosed as useful for the dyeing of the aforesaid fiber materials, affording dyeings of good wet-fastness properties.

---

The present invention concerns new, fiber-reactive disazo dyestuffs, a process for the production of these dyestuffs, their use for the dyeing of textile material, particularly natural and regenerated cellulose fibers, as well as, as industrial products, the material dyed by the use of the new dyestuffs.

It has been found that valuable, new, fiber-reactive disazo dyestuffs are obtained when an amino disazo dystuff of the general Formula I

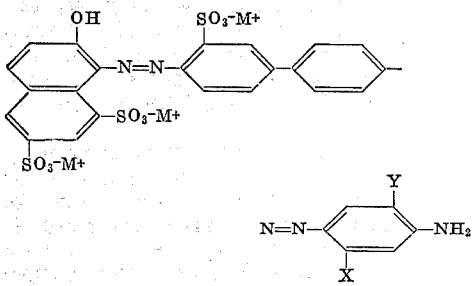

(I)

is reacted with an acylating agent the acyl radical A of which can enter into at least one covalent bond with the substrate, particularly, natural and regenerated cellulose fibers to form a fiber-reactive disazo dyestuff of the general Formula II

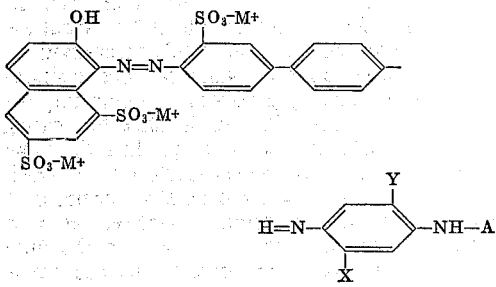

(II)

in which formulas

M+ represents a colorless cation, especially hydrogen or an alkali metal ion,
A represents a fiber-reactive acyl radical capable of forming at least on covalent bond with a cellulosic or polyamide substrate, and which radical does not substantially affect the shade of the remainder of the dyestuff molecule,
X represents hydrogen or a lower alkyl group and
Y represents hydrogen, a lower alkyl or a lower alkoxy group.

If X and/or Y represent a lower alkyl group then this is, e.g. the methyl, ethyl, propyl or isopropyl group. If Y is a lower alkoxy group this is principally the methoxy or ethoxy group. Preferably, X and Y independently of each other represents the methyl group or hydrogen.

Suitable as fiber-reactive acyl radical A in the dyestuffs according to the invention are, for example: the radical of an acid containing at least one mobile halogen atom and/or a carbon-to-carbon polybond to which addition can be made, e.g. the radical of chloroacetic or bromoacetic acid, β-chloropropionic and β-bromopropionic acid, propiolic acid, acrylic acid, methacrylic acid, α-chloro,β-chloro-, α-bromo- and β-bromo acrylic acid, α,β- and β,β-dichloroacrylic acid or α,β- and β,β-dibromoacrylic acid, trichloro- or tribromo-acrylic acid, crotonic acid, α- or β-chlorocrotonic acid or α- or β-bromocrotonic acid, α,β-dichlorocrotonic acid, maleic acid, monochloro- and monobromo-maleic acid, dichloro- and dibromo-maleic acid, fumaric acid, monochloro- and monobromo-fumaric acid, dichloro- and dibromo-fumaric acid, fumaric acid monoester, dichloro- and dibromo-succinic acid, β-sulfato- or β-halogenoethyl-sulfonic acid; the radical of a nitrohalogen benzoic acid or nitrohalogen benzene sulfonic acid having a mobile halogen atom, in particular having fluorine or chlorine in o- or p-position to the nitro group such as the radical of 3-nitro-4-fluorobenzoic acid or 3-nitro-4-chloro-benzene sulfonic acid; also the radical of a polyhalide of a cyclic imide of carbonic acid, particularly a triazinyl or diazinyl radical having at least one mobile halogen atom, e.g. the radical of cyanuric chloride, cyanuric bromide or primary condensation products thereof in which a halogen atom is replaced by the optionally further substituted radical of a primary or secondary aliphatic, alicyclic, aromatic or heterocyclic amine, in particular by aniline or its alkyl and sulfonic acid or carboxylic acid derivatives, by lower mono- and di-alkyl-amines as well as by ammonia, or by the radical of an aliphatic, alicyclic, aromaticor heterocyclic hydroxy or thiol compound. Further, A represents a polyhalogenopyrimidine radical such as the di- or trichloropyrimidyl, di- or trifluoropyrimidyl or di- or tribromopyrimidyl radical which, in the 5-position, can have the following substituents, e.g. methyl, ethyl, carboxylic or sulfonic acid amide optionally substituted at the nitrogen atom, carboxylic acid methyl or ethyl ester, acyl, e.g. benzoyl, alkylene, e.g. allyl, chlorovinyl, substituted alkyl, e.g. carboxymethyl, chloromethyl or bromomethyl, particularly however, halogen, the radical of a reactive heterocyclic carboxylic or sulfonic acid such as the radical of halogenopyrimidine carboxylic acid, of 2,3-dihalogenoquinoxaline carboxylic acid or 2,3-dihalogenoquinoxaline sulfonic acid, of 2-halogen-benzo-thiazole or -oxazole carboxylic or sulfonic acid, of halogenophthalazine carboxylic acid, or halogenoquinazoline carboxylic acid or the radical of halogen-6-pyridazon-1-yl-alkylene or halogen-6-pyridazon-1-yl-phenylene carboxylic acid. The radicals of the following compounds are particularly suitable: 2,4,6-trichloro-, 2,4,6-trifluoro- or 2,4,6-tribromo-pyrimidine, 2,4,6-trichloro-5-bromopyrimidine, 2,4,5,6-tetrachloro- or 2,4,5,6-tetrabromo-pyrimidine, 2,4-dichloropyrimidine-5- or -6- carboxylic acid, 2,3-dichloroquinoxaline-6-carboxylic or sulfonic acid, 2-chlorobenzo-thiazole- or oxazole-5- or -6-carboxylic or sulfonic acid, 1,4-dichloro- or 1,4-dibromo-phthalazine-6-carboxylic acid, 2,4-dichloroquinazoline-6- or -7-carboxylic acid, 4,5-dichloro-6-pyridazon-1-yl-tri-methylene carboxylic acid or -1',4'-phenylene carboxylic acid.

Particularly valuable fiber-reactive acyl radicals A are derived from a polyhalide of a cyclic imide of carbonic acid, particularly a polyhalogenopyrimidine and especially from a tri- or tetra-chloropyrimidine.

The starting materials of Formula I are known and can be produced by known methods, e.g. by coupling the tetrazonium compound from 1 mol of 4,4'-diamino-1,1'-diphenyl-3-sulfonic acid on the one hand with 1 mol of 2-hydroxynaphthalene-6,8-disulfonic acid and on the other with 1 mol of an aminobenzene coupling in p-position to the amino group of Formula III

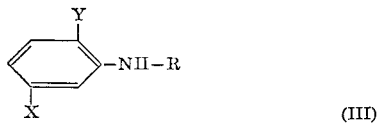

(III)

wherein X and Y have the meanings given in Formula I and R represents hydrogen or the methyl sulfonic acid group. Particularly valuable as starting material of Formula I is a mixture of two amino disazo dystuffs which can be produced by using a mixture of aminobenzenes of Formula III as second coupling component. If desired, the diazonium salt of a 4-amino-4'-acylamino-1,1'-diphenyl-3-sulfonic acid, e.g. of 4-amino-4'-acetylamino-1,1'-diphenyl-3-sulfonic acid, can also be coupled with 2-hydroxynaphthalene-6,8-disulfonic acid, the acetylamino group saponified, the amino monoazo dyestuff obtained diazotised and coupled with an aminobenzene of Formula III to form the amino disazo dyestuffs of Formula I. If an aminobenzene-N-methyl sulfonic acid is used as second coupling component, then the coupling product should subsequently be saponified, e.g. by heating the alkaline solution for several hours at 50–60° C.

The halides, particularly chlorides but also anhydrides of the carboxylic or sulfonic acids mentioned in the discussion of A and, principally, halogen triazines and di-azines containing more than one mobile halogen atom, in the latter case particularly tri- or tetra-chloropyrimidine are used as agents introducing the fiber-reactive radical A.

The reaction of the amino disazo dystuff of Formula I with the acylating agent as defined is performed in the usual way, advantageously in aqueous medium, optionally in the presence of inert organic solvents which can easily be removed such as low aliphatic ketones, e.g. acetone, and preferably in the presence of agents which buffer mineral acid such as sodium or potassium carbonate, sodium or potassium hydroxide, di- or tri-sodium phosphate or di- or tri-potassium phosphate, sodium or potassium acetate or tertiary nitrogen bases such as pyridine.

On completion of the acylation, the obtained fiber-reactive disazo dystuff is salted out from its optionally previously neutralised solution or suspension with sodium or potassium chloride or is precipitated with an acid. It is then filtered off under suction, washed and dried. Advantageously the new fiber-reactive disazo dyestuffs are dried at a moderate temperature, if desired under reduced pressure.

The new fiber-reactive disazo dyestuffs or mixtures of dyestuffs are dark powders which, in the form of their alkali metal salts, have good water solubility. They are suitable for the dyeing of textile material, particularly natural or regenerated cellulose fibers such as staple rayon, jute, linen, ramie, hemp and, principally cotton, in pure scarlet to red shades having good colour strength. Due to their increased drawing and fixing power onto cellulose fibers when compared with similar reactive disazo dyestuffs, they are suitable in particular for the dyeing of cellulose material by the exhaustion process from a long liquor in the presence of an acid binding agent and a neutral salt which accelerates exhaustion such as sodium chloride or sodium sulfate. The goods are introduced into the dyebath at a slightly raised temperature, the bath is gradually brought to temperatures of 80 to 100° C. and dyeing is completed at this temperature. The neutral salts which accelerate the drawing of the dyestuff can be added to the dyebath, if desired, after the actual dyeing temperature has been attained.

The new dyestuffs are chemically bound to the fiber by treatment with acid binding agents. After soaping to remove non-fixed dyestuff, the cellulose dyeings have excellent fastness to washing, water, perspiration, alkali, crocking and light and, in addition, can be discharged a neutral, pure white. It is surprising that in spite of the increased drawing power on soaping in baths having a low electrolyte content, non-fixed dyestuff can be easily and completely washed out. This is an essential condition for good wet-fastness properties of cellulose dyeings attained with fiber-reactive dyestuffs.

The new fiber-reactive disazo dyestuffs can also be used for the dyeing of fiber material containing polyamide, e.g. of natural polyamide such as wool or silk, or of synthetic polyamide such as nylon. Natural polyamide fibers are dyed in hot, weakly acid, e.g. in acetic acid bath in the presence of auxiliaries which improve the evenness of the dyeing such as fatty acid-alkanol-amine polycondensation products, as well as, optionally, in the presence of salts such as sodium chloride or sulfate. Synthetic polyamide fibers are advantageously dyed in a hot acid bath, then rinsed and after-treated in a boiling alkaline bath.

The term "lower" used in this specification and the appended claims defining "alkyl" or "alkoxy" radicals, means that such radicals have at most 4 carbon atoms.

The following non-limitative examples illustrate the invention further. The temperatures are given therein in degrees centigrade. Percentages are given by weight unless expressly stated otherwise.

EXAMPLE 1

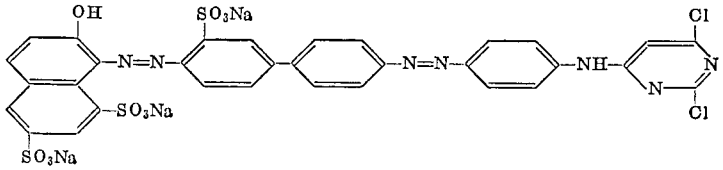

26.4 g. of 4,4'-diamino-1,1'-diphenyl-3-sulfonic acid are stirred in 300 ml. of water and 40 ml. of concentrated hydrochloric acid and tetrazotised by the dropwise addition of a solution of 13.8 g. of sodium nitrite in 27 ml. of water. 31 g. of 2-hydroxynaphthalene-6,8-disulfonic acid in the form of the sodium salt are then added to the tetrazo solution and then 25 ml. of concentrated sodium hydroxide solution are added until the pH of the reaction solution has increased to 9. As soon as the monoazo dyestuff formation is complete, first 2 ml. of concentrated hydrochloric acid and then 18.7 g. of aminobenzene-N-methyl sulfonic acid are added.

The deep red solution of the disazo dyestuff formed is heated to 50°, 42 g. of sodium hydroxide are added and the N-methylsulfonic acid group is saponified for 3 hours at 50–60°. At the end of this time, the solution is acidified with 120 ml. of aqueous 30% hydrochloric acid, the amino disazo dyestuff obtained is salted out by the addition of sodium chloride and filtered off.

The filter residue is dissolved in 800 ml. of water and 6 g. of sodium carbonate at 70° and 17.85 g. of 2,4,6-trichloropyrimidine are added. The pH is kept at 6.0–6.5 by the dropwise addition of sodium carbonate solution. When the condensation at 70° is complete, the disazo dyestuff obtained is precipitated with sodium chloride, filtered off, dried in vacuo at 60–70° and milled. It is a dark brown powder which dissolves in water with a scarlet and in concentrated sulfuric acid with a violet colour. It dyes cotton and regenerated cellulose fibers from a bath containing Glaubers salt and sodium carbonate in pure scarlet shades which have good fastness to light, washing and perspiration. The dyeings can be discharged a neutral pure white.

The same dyestuff is obtained by diazotising 4-amino-4'-acetylamino-1,1'-diphenyl - 3 - sulfonic acid, coupling with 2-hydroxynaphthalene-6,8-disulfonic acid, saponifying the acetylamino group with sodium hydroxide solution, diazotising the amino monoazo dyestuff obtained and coupling, as described in the example, with aminobenzene-N-methyl sulfonic acid saponifying and acylating.

Similar brilliant scarlet dyestuffs are obtained if the amino disazo dyestuff described in Example 1 is reacted with the equivalent amount of one of the acylating agents given in the following Table I, column II instead of with 17.85 g. of 2,4,6-trichloro-pyrimidine, the reaction being performed at the reaction temperature given in the third column.

TABLE I

| I Example No. | II Acylating agent | III Reaction temperature, degrees | IV Shade on cellulose |
|---|---|---|---|
| 2 | (2,4,6-trichloropyrimidine) | 70 | Scarlet. |
| 3 | (5-bromo-2,4-dichloropyrimidine) | 70 | Do. |
| 4 | (2,4-dichloro-1,3,5-triazine) | 0 | Do. |
| 5 | CH₃—C(Cl)=CH—COCl | 0–5 | Do. |
| 6 | Cl—CO—C₆H₃(NO₂)—F | 0–5 | Do. |

TABLE I—Continued

| I Example No. | II Acylating agent | III Reaction temperature, degrees | IV Shade on cellulose |
|---|---|---|---|
| 7 | (2,4-dichloro-6-(phenylsulfonic)amino-1,3,5-triazine) | 40 | Do. |
| 8 | Cl—CO—(2,4-dichloropyrimidin-5-yl) | 0 | Do. |
| 9 | Cl—CO—(2,3-dichloroquinoxalin-6-yl) | 10 | Do. |
| 10 | Cl—CO—(2-chlorobenzothiazol-6-yl) | 10 | Do. |
| 11 | Cl—COCH₂—CH₂—Cl | 5 | Do. |
| 12 | CH₂=CH—COCl | 0–5 | Do. |

By repeating each of Examples 1–12, but using, instead of 18.7 g. of aminobenzene-N-methyl-sulfonic acid, 20.1 g. of 2-methyl-1-aminobenzene-N-methyl sulfonic acid for the production of the amino-disazo dyestuff there are obtained similar fiber-reactive disazo dyestuffs which afford scarlet dyeings with excellent color yields on cotton.

These dyeings have similar satisfactory fastness properties as those of Example 1.

EXAMPLE 13

26.4 g. of 4,4'-diamino-1,1'-diphenyl-3-sulfonic acid are tetrazotised as described in Example 1 and coupled with 31 g. of 2-hydroxynaphthalene-6,8-disulfonic acid. A mixture of 5.3 g. of 3-methyl-1-aminobenzene and 6.05 g. of 2,5-dimethyl-1-aminobenzene is added to the suspension of the diazonium monoazo dyestuff obtained, the pH of which is 3. As soon as the coupling is complete, the coupling solution is made weakly alkaline with 10 ml. of concentrated aqueous sodium hydroxide solution and the amino disazo dyestuff obtained is salted out by the addition of sodium chloride and filtered off. It is then dissolved in 600 ml. of water at 70°, then 21.4 g. of 2,4,5,6-tetrachloropyrimidine are added to the dyestuff solution and the pH of the solution is kept between 6 and 6.5 by the gradual addition of 6.4 g. of sodium carbonate. The condensation is complete after 4 hours. The mixture of dyestuffs of the formulas

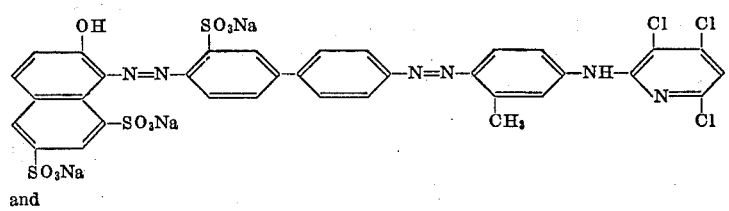

and

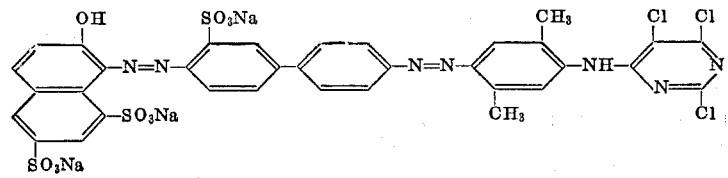

in a molar ratio of about 1:1 is precipitated with sodium chloride, filtered off, washed, dried and milled. It forms a red-brown powder which dissolves in water with a scarlet and in concentrated sulfuric acid with a blue-violet colour. It dyes natural or regenerated cellulose fibers from a soda alkaline liquor in deep scarlet shades. Non-fixed dyestuff can easily be washed out by soaping. The dyestuff mixture has less tendency to precipitation in the presence of electrolytes than the components.

Dyestuffs or mixtures of dyestuffs having similar properties are obtained, if, instead of the mixture of 5.3 g. of 3-methyl-1-aminobenzene and 6.05 g. of 2,5-dimethyl-1-aminobenzene described in the example, equivalent amounts of one of the other amines or mixtures of amines given in the following Table II, column II, are used and condensation is performed with 21.4 g. of 2,4,5,6-tetrachloropyrimidine or one of the acylating agents mentioned in Table I, column II, under the conditions there described.

TABLE II

| I | II | III |
|---|---|---|
| Example No. | Amine or mixture of amines | Shade on cellulose |
| 14 | Mixture of 3.6 g. of 3-methyl-1-aminobenzene and 8.05 g. of 2,5-dimethyl-1-aminobenzene. | Scarlet. |
| 15 | 3-methyl-1-aminobenzene | Do. |
| 16 | 3-ethyl-1-aminobenzene | Do. |
| 17 | 2-methoxy-5-methyl-1-aminobenzene | Red. |
| 18 | 2-ethoxy-5-methyl-1-aminobenzene | Red. |
| 19 | 2,5-diethyl-1-aminobenzene | Scarlet. |
| 20 | 2,5-di-isopropyl-1-aminobenzene | Do. |

Similar dyestuff of satisfactory dyeing properties are obtained when varying the molar ratio of 3-methyl-1-aminobenzene to 2,5-dimethyl-1-aminobenzene in Example 13 within the range of from 10:1 to 1:10.

EXAMPLE 21

3 g. of the mixture of dyestuffs described in Example 13 are dissolved in a dyebath of 1000 ml. of water and 20 g. of sodium carbonate are added. 100 g. of mercerised cotton are introduced at 40°, the bath is heated to 90° within 30 minutes, 60 g. of sodium sulfate are added to the dyebath and dyeing is performed for 1 hour at this temperature. The dyeing obtained is then rinsed and soaped at the boil for 15 minutes.

A deep, scarlet dyeing is obtained which has excellent fastness to washing, water, perspiration and crocking. The dyeing can be discharged a neutral pure white.

I claim:

1. A dyestuff of the formula

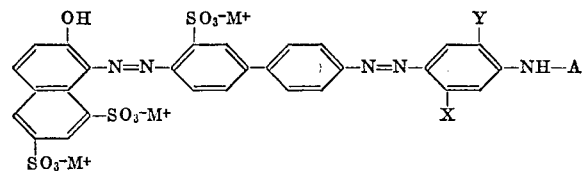

wherein

M+ represents hydrogen or an alkali metal ion,
A represents a fiber-reactive grouping selected from
(a) a radical of the formula

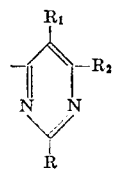

wherein

R₁ represents hydrogen, chloro or bromo
R₂ represents chloro or bromo, and
R₃ represents chloro or bromo;

and
(b) a radical of the formula

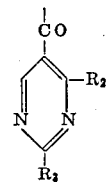

wherein

R₂ and R₃ have the meaning as given above;
X represents hydrogen or a lower alkyl group, and
Y represents hydrogen, a lower alkyl or a lower alkoxy group.

2. A dyestuff as defined in claim 1, wherein A represents dichloropyrimidyl or trichloropyrimidyl.
3. A dyestuff as defined in claim 1, wherein each of X and Y represents hydrogen or methyl.
4. A dyestuff as defined in claim 1, which is of the formula

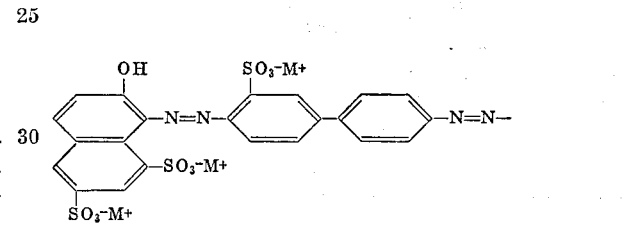

5. A dyestuff as defined in claim 1 which is of the formula

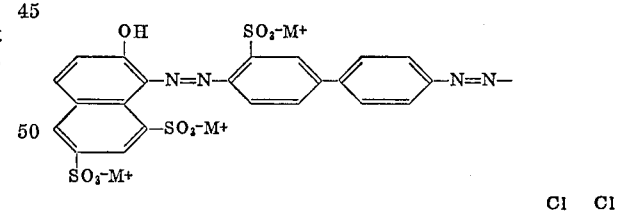

6. A dyestuff as defined in claim 1 which is of the formula

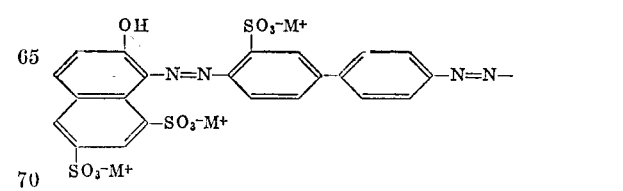

7. A dyestuff as defined in claim 1 which is of the formula
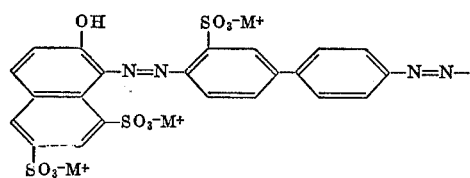
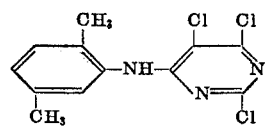
References Cited
UNITED STATES PATENTS
3,141,874  7/1964  Ischer et al. _____ 260—154 X
CHARLES B. PARKER, Primary Examiner
C. F. WARREN, Assistant Examiner
U.S. Cl. X.R.
8—41 B, 50, 51; 260—152, 153, 158